US008054059B2

United States Patent
Wu

(10) Patent No.: US 8,054,059 B2
(45) Date of Patent: Nov. 8, 2011

(54) DC/DC CONVERTER AND CURRENT SENSE CIRCUIT THEREOF

(75) Inventor: Kuo-Hung Wu, Sinshih Township, Tainan County (TW)

(73) Assignee: Himax Analogic, Inc., Sinshih Township, Tainan County (TW)

( * ) Notice: Subject to any disclaimer, the term of this patent is extended or adjusted under 35 U.S.C. 154(b) by 711 days.

(21) Appl. No.: 12/204,300

(22) Filed: Sep. 4, 2008

(65) Prior Publication Data

US 2010/0052632 A1 Mar. 4, 2010

(51) Int. Cl.
*G05F 3/04* (2006.01)

(52) U.S. Cl. ........ 323/311; 323/312; 323/314; 323/315; 323/222

(58) Field of Classification Search .................. 323/222, 323/282, 311, 312, 313, 314, 315, 316, 317; 327/530, 537, 538, 539, 540
See application file for complete search history.

(56) References Cited

U.S. PATENT DOCUMENTS

| 5,373,266 A | * | 12/1994 | Lenzing et al. | ............... 333/116 |
| 5,703,477 A | * | 12/1997 | Punzenberger | ............... 323/313 |
| 6,720,755 B1 | * | 4/2004 | Sharpe-Geisler | ............. 323/314 |

* cited by examiner

*Primary Examiner* — Adolf Berhane
*Assistant Examiner* — Nguyen Tran
(74) *Attorney, Agent, or Firm* — Thomas, Kayden, Horstemeyer & Risley, LLP

(57) ABSTRACT

A current sense circuit includes a power transistor, a first level shifter, an operational transconductance amplifier (OTA), a second level shifter, and a dummy transistor. The power transistor has a first terminal and a power control terminal coupled to a control voltage. The first level shifter is coupled to the first terminal and pulls up a voltage of the first terminal to an operating voltage. The OTA is coupled to the first level shifter and converts the operating voltage into an operating current. The second level shifter is coupled to the OTA and pulls down the operating voltage to the voltage of the first terminal. The dummy transistor has a dummy control terminal with the control voltage, and a third terminal coupled to the second level shifter and having the same voltage as the voltage of the first terminal.

22 Claims, 2 Drawing Sheets

DC/DC CONVERTER AND CURRENT SENSE CIRCUIT THEREOF

BACKGROUND

1. Field of Invention

The present invention relates to a sense circuit. More particularly, the present invention relates to a current sense circuit for current-mode DC/DC converters.

2. Description of Related Art

In a conventional current-mode controlled DC-to-DC (DC/DC) converter, a current sense circuit including operational amplifiers (OP) provides a sensed current based on a load current. By utilizing the operational amplifier, a scaled current can be acquired from a power transistor and generated through a dummy transistor.

However, the operating voltages of the power transistor and the dummy transistor are usually very low, so the input of the operational amplifier still has to be kept at a low voltage/current level while the operational amplifier is supposed to operate at a high speed appropriately. The operational amplifier also needs compensation as well such that the operational amplifier cannot operate at the high speed as expected. As a result, the current sense circuit fails to provide the sensed current correctly.

SUMMARY

In accordance with one embodiment of the present invention, a current sense circuit is provided. The current sense circuit includes a power transistor, a first level shifter, an operational transconductance amplifier (OTA), a second level shifter, and a dummy transistor. The power transistor has a first terminal, a second terminal coupled to a first power voltage, and a power control terminal coupled to a control voltage. The first level shifter is coupled to the first terminal and pulls up a voltage of the first terminal to an operating voltage. The OTA is coupled to the first level shifter and converts the operating voltage into an operating current. The second level shifter is coupled to the OTA and pulls down the operating voltage to the voltage of the first terminal. The dummy transistor has a dummy control terminal with the control voltage, a third terminal coupled to the second level shifter and having the same voltage as the voltage of the first terminal, and a fourth terminal coupled to the first power voltage.

In accordance with another embodiment of the present invention, a DC/DC converter is provided. The DC/DC converter includes a control circuit, a switch and a current sense circuit. The control circuit outputs a pulse drive signal. The switch is activated by the pulse drive signal, such that an inductor is charged by an input voltage to deliver an inducting current. The current sense circuit senses the inducting current to output a current sense signal to be superimposed by a slope compensation signal output by a slope compensation circuit, in which the superimposition of the current sense signal and the slope compensation signal is transformed into a feedback signal for controlling the control circuit. The current sense circuit includes a power transistor, a first level shifter, an operational transconductance amplifier (OTA), a second level shifter, and a dummy transistor. The power transistor has a first terminal, a second terminal coupled to a first power voltage, and a power control terminal coupled to a control voltage. The first level shifter is coupled to the first terminal and pulls up a voltage of the first terminal to an operating voltage. The OTA is coupled to the first level shifter and converts the operating voltage into an operating current. The second level shifter is coupled to the OTA and pulls down the operating voltage to the voltage of the first terminal. The dummy transistor has a dummy control terminal with the control voltage, a third terminal coupled to the second level shifter and having the same voltage as the voltage of the first terminal, and a fourth terminal coupled to the first power voltage.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference to the accompanying drawings as follows.

DESCRIPTION OF THE PREFERRED EMBODIMENTS

In the following detailed description, the embodiments of the present invention have been shown and described. As will be realized, the invention is capable of modification in various respects, all without departing from the invention. Accordingly, the drawings and description are to be regarded as illustrative in nature, and not restrictive.

Figure 1:
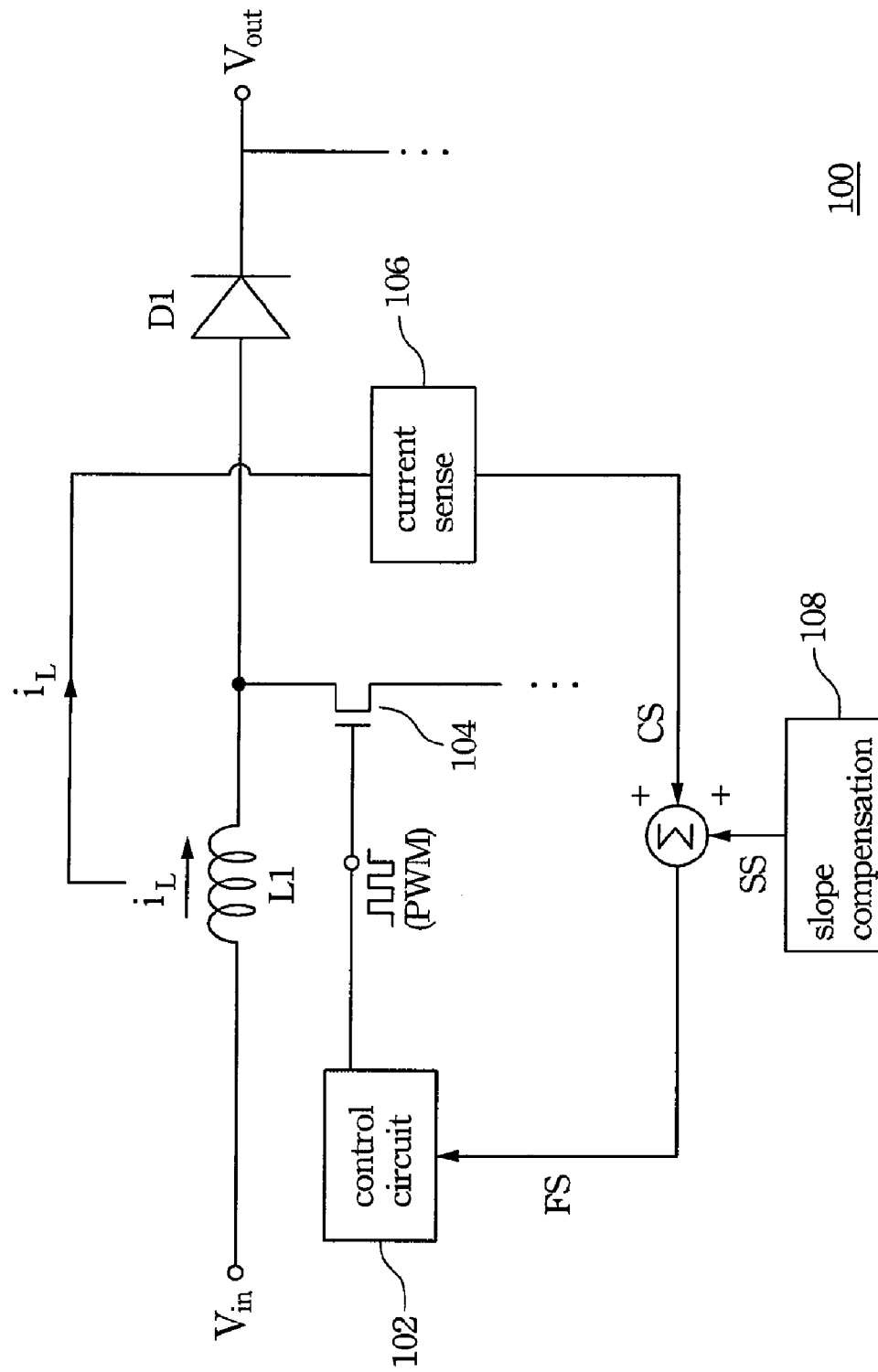
FIG. 1 illustrates a general block diagram of a current-mode DC to DC (DC/DC) converter according to one embodiment of the present invention.

FIG. 1 illustrates a general block diagram of a current-mode DC-to-DC (DC/DC) converter according to one embodiment of the present invention. The DC/DC converter 100 includes an inductor L1, a diode D1, a control circuit 102, a switch 104, a current sense circuit 106, and a slope compensation circuit 108. The inductor L1 has a first end electrically coupled to an input voltage Vin and a second end electrically coupled to the switch 104 and the anode of the diode D1. The inductor L1 is charged by the input voltage Vin to deliver an inducting current $i_L$ when the switch 104 is activated. An output voltage Vout is generated at the cathode of the diode D1.

The current sense circuit 106 receives the inducting current $i_L$ and outputs a current sense signal CS. The slope compensation circuit 108 generates a slope compensation signal SS superimposed on the current sense signal CS. The superimposition of the slope compensation signal SS and the current sense signal CS is transformed into a feedback signal FS for controlling the control circuit 102. In one embodiment, both the slope compensation signal SS and the current sense signal CS appear in the form of current, and the superimposition of both currents are transformed into a voltage (i.e. feedback signal FS) to control the control circuit 102. The control circuit 102 then accordingly outputs a pulse drive signal, which may be in the form of pulse width modulation (PWM), to activate the switch 104.

Figure 2:
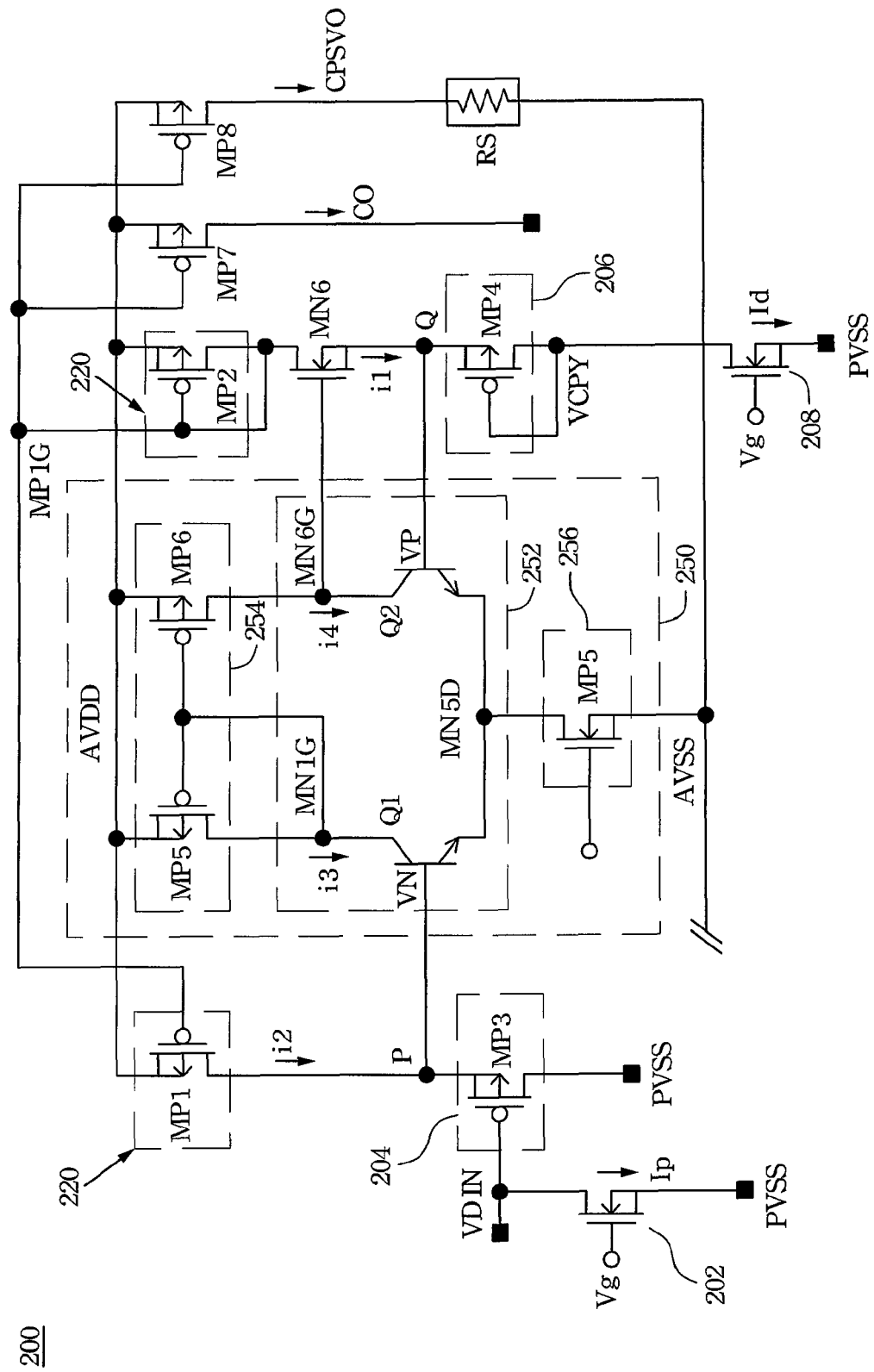
FIG. 2 illustrates a circuit diagram of the current sense circuit according to one embodiment of the present invention.

FIG. 2 illustrates a circuit diagram of the current sense circuit according to one embodiment of the present invention. The current sense circuit 200 includes a power MOSFET 202, a first level shifter 204, an operational transconductance amplifier (OTA) 250, a second level shifter 206, a current mirror 220, and a dummy MOSFET 208. The power MOSFET 202, in the present embodiment, is an NMOS having a gate coupled to a control voltage Vg, a source coupled to a power voltage PVSS, and a drain coupled to the first level shifter 204. The first level shifter 204 is coupled to the drain of the power MOSFET 202 and pulls up the voltage, i.e. VDIN, of the drain of the power MOSFET 202 to an operating voltage VN. The OTA 250 is coupled to the first level shifter 204 at node P and coupled to the second level shifter 206 at node Q, and converts the operating voltage VN into an operating current i1 through node Q, in which node Q has an operating voltage VP as same as the voltage VN. The second level shifter 206 is coupled to the OTA 250 and pulls down the voltage VP to the voltage VCPY such that the voltage VCPY is the same as the voltage VDIN. The current mirror 220 is provided for mirroring the operating current i1, flowing through node Q, to generate the current i2 which flows through the first level shifter 204 for pulling up the voltage VDIN to the voltage VN.

The dummy MOSFET 208, in the present embodiment, is another NMOS. The dummy MOSFET 208 has a drain coupled to the second level shifter 206 and having the voltage VCPY, and a source coupled to the power voltage PVSS. Notably, the dummy MOSFET 208 is designed to match the power MOSFET 202 such that the gate-drain voltages, i.e. $V_{GD}$, of both MOSFETs are the same. Thus, the gate voltage of the dummy MOSFET 208 is the same as the gate voltage Vg of the power MOSFET 202 because the voltages VCPY and VDIN are the same.

In conventional analog integrated circuit designs, transistors are formed as multi-fingered devices. In other words, larger sized transistors are made of multiple smaller sized transistors connected in parallel. In one embodiment, the dummy MOSFET 208 is formed having a width/length (W/L) ratio of W/L=S, and the power MOSFET 202 is formed using 1000 fingers (M=1000) with each finger having the W/L ratio of W/L=S. In other words, the power MOSFET 202 is 1000 times the size of the dummy MOSFET 208. Thus, in the actual physical layout of the power MOSFET 202, there are physically 1000 NMOS transistors, each having the size of W/L=S, connected in parallel to make a single power MOSFET 202. Since the operating point of the power MOSFET 202 is the same as that of the dummy MOSFET 208 and the power MOSFET 202 is multiple times the size of the dummy MOSFET 208, the current Ip flowing through the power MOSFET 202 is thus multiple times the value of the current Id flowing through the dummy MOSFET 208.

Refer to the circuit as illustrated in FIG. 2. The first level shifter 204 can further include a PMOS transistor MP3. The transistor MP3 has a gate coupled to the drain of the power MOSFET 202, a drain coupled to the power voltage PVSS, and a source coupled to the OTA 250 and the current mirror 220 at node P. The second level shifter 206 can further include a PMOS transistor MP4. The transistor MP4 has a gate and a drain coupled with each other and coupled to the drain of the dummy MOSFET 208, and a source coupled to the OTA 250 and an NMOS transistor MN6 at node Q, in which MN6 is provided as a feedback element for the OTA 250. As a result, the current Id flowing through the dummy MOSFET 208 is the same as the current i1 flowing through node Q and the transistor MP4.

The current mirror 220 includes PMOS transistors MP1 and MP2. The transistor MP1 has a gate coupled to the gate of MP2, a source coupled to the power voltage AVDD, and a drain coupled to the source of MP3 at node P. The gate and drain of MP2 are coupled with each other and coupled to the drain of MN6, and the source of MP2 is coupled to the power voltage AVDD.

The OTA 250 can further include a differential pair circuit 252, a current mirror 254, and a current source 256. The differential pair circuit 252 is current biased by the current source 256 and has a pair of differential inputs coupled to the voltages VN and VP, respectively. The current mirror 254 is coupled to the differential pair circuit 252 such that the differential currents i3 and i4 flowing through the differential pair circuit 252 are the same and the differential inputs have the same voltage.

The differential pair circuit 252 includes two bipolar junction transistors (BJT) Q1 and Q2. The transistor Q1 has a base used as one of the differential inputs to be coupled to the voltage VN, a collector coupled to the current mirror 254, and an emitter coupled to the current source 256. Similarly, the transistor Q2 has a base used as one of the differential inputs to be coupled to the voltage VP, a collector coupled to the current mirror 254 and the gate of MN6, and an emitter coupled to the current source 256, in which the current source 256 can be carried out by an NMOS transistor MN5 having a drain coupled to the emitters of Q1 and Q2 and a source coupled to the power voltage AVSS.

The current mirror 254 includes PMOS transistors MP5 and MP6. The gate and drain of MP5 are coupled with each other and coupled to the collector of Q1 at node MN1G, and the source of MP5 is coupled to the power voltage AVDD. The transistor MP6 has a gate coupled to the gate of MP5, a source coupled to the power voltage AVDD, and a drain coupled to the collector of Q1 and the gate of MN6 at node MN6G.

In accordance with the aforementioned circuit, the operating point of the dummy MOSFET 208 is designed to be the same as that of the power MOSFET 202, so the current Id flowing through the dummy MOSFET 208 can be thus generated or considered acquiring from the current Ip flowing through the power MOSFET 202. Further, the current Ip is multiple times the value of the current Id due to the dummy MOSFET 208 and the power MOSFET 202 having different sizes.

In addition, the current sense circuit 200 can further include a PMOS MP7, in which MP7 has a gate coupled to the gate of MP2, and a source coupled to the power voltage AVDD. MP7 together with MP2 form a current mirror as well such that a current CO is mirrored from the current i1 and generated at the drain of MP7 to be superimposed on the slope compensation signal. Moreover, the current sense circuit 200 can further include a PMOS MP8, in which MP8 has a gate coupled to the gate of MP2, a source coupled to the power voltage AVDD, and a drain coupled to an impedance RS. MP8 together with MP2 form another current mirror as well such that a current CPSVO is mirrored from the current i1 and generated at the drain of MP8 to be transformed into a voltage, through the impedance RS, compared with an absolute voltage of the system, for protection.

For the foregoing embodiments, the current sense circuit can be employed to provide the sensed current without the use of operational amplifiers. Therefore, the current sense circuit can be operated at a high speed because it needs no operational amplifiers and capacitors and the compensation operation.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A current sense circuit, comprising:
   a power transistor having a first terminal, a second terminal coupled to a first power voltage, and a power control terminal coupled to a control voltage;
   a first level shifter coupled to the first terminal and pulling up a voltage of the first terminal to an operating voltage;
   an operational transconductance amplifier (OTA) coupled to the first level shifter and converting the operating voltage into an operating current;
   a second level shifter coupled to the OTA and pulling down the operating voltage to the voltage of the first terminal; and
   a dummy transistor having a dummy control terminal with the control voltage, a third terminal coupled to the second level shifter and having the same voltage as the voltage of the first terminal, and a fourth terminal coupled to the first power voltage.

2. The current sense circuit as claimed in claim 1, wherein the power transistor is multiple times the size of the dummy transistor.

3. The current sense circuit as claimed in claim 1, wherein the power transistor is made of multiple of the dummy transistors connected in parallel.

4. The current sense circuit as claimed in claim 2 or 3, wherein a current flowing through the power transistor is multiple times the value of another current flowing through the dummy transistor.

5. The current sense circuit as claimed in claim 1, wherein the OTA further comprises:
   a differential pair circuit current biased by a current source and having a pair of differential inputs having the same voltage, one of the differential inputs being coupled to the operating voltage pulled up by the first level shifter.

6. The current sense circuit as claimed in claim 5, wherein the OTA further comprises:
   a first current mirror coupled to the differential pair circuit such that differential currents flowing through the differential pair circuit being the same and the differential inputs having the same voltage.

7. The current sense circuit as claimed in claim 6, wherein the differential pair circuit further comprises:
   a first BJT having a first base as one of the differential inputs, a third terminal coupled to the first current mirror, and a fourth terminal coupled to the current source; and
   a second BJT having a second base as the other of the differential inputs, a fifth terminal coupled to the first current mirror, and a sixth terminal coupled to the current source.

8. The current sense circuit as claimed in claim 7, wherein the first current mirror further comprises:
   a first MOS transistor having a seventh terminal coupled to a second power voltage, and an eighth terminal and a first control terminal both coupled to the third terminal of the first BJT; and
   a second MOS transistor having a second control terminal coupled to the first control terminal, a ninth terminal coupled to the second power voltage, and a tenth terminal coupled to the fifth terminal of the second BJT.

9. The current sense circuit as claimed in claim 5, wherein the first level shifter further comprises:
   a third MOS transistor having a third control terminal coupled to the first terminal of the power transistor, an eleventh terminal coupled to one of the differential inputs, and a twelfth terminal coupled to the first power voltage.

10. The current sense circuit as claimed in claim 9, wherein the second level shifter further comprises:
    a fourth MOS transistor having a thirteenth terminal coupled to the other of the differential inputs, and a fourth control terminal and a fourteenth terminal both coupled to the third terminal of the dummy transistor.

11. The current sense circuit as claimed in claim 1, further comprising:
    a second current mirror mirroring the operating current to the first level shifter for pulling up the voltage of the first terminal of the power transistor to the operating voltage.

12. A DC/DC converter, comprising:
    a control circuit outputting a pulse drive signal;
    a switch activated by the pulse drive signal, such that an inductor is charged by an input voltage to deliver an inducting current; and
    a current sense circuit sensing the inducting current to output a current sense signal to be superimposed by a slope compensation signal output by a slope compensation circuit, the superimposition of the current sense signal and the slope compensation signal being transformed into a feedback signal for controlling the control circuit, the current sense circuit comprising:
        a power transistor having a first terminal, a second terminal coupled to a first power voltage, and a power control terminal coupled to a control voltage;
        a first level shifter coupled to the first terminal and pulling up a voltage of the first terminal to an operating voltage;
        an operational transconductance amplifier (OTA) coupled to the first level shifter and converting the operating voltage into an operating current;
        a second level shifter coupled to the OTA and pulling down the operating voltage to the voltage of the first terminal; and
        a dummy transistor having a dummy control terminal with the control voltage, a third terminal coupled to the second level shifter and having the same voltage as the voltage of the first terminal, and a fourth terminal coupled to the first power voltage.

13. The DC/DC converter as claimed in claim 12, wherein the power transistor is multiple times the size of the dummy transistor.

14. The DC/DC converter as claimed in claim 12, wherein the power transistor is made of multiple of the dummy transistors connected in parallel.

15. The DC/DC converter as claimed in claim 13 or 14, wherein a current flowing through the power transistor is multiple times the value of another current flowing through the dummy transistor.

16. The DC/DC converter as claimed in claim 12, wherein the OTA further comprises:
    a differential pair circuit current biased by a current source and having a pair of differential inputs having the same voltage, one of the differential inputs being coupled to the operating voltage pulled up by the first level shifter.

17. The DC/DC converter as claimed in claim 16, wherein the OTA further comprises:
    a first current mirror coupled to the differential pair circuit such that differential currents flowing through the differential pair circuit being the same and the differential inputs having the same voltage.

18. The DC/DC converter as claimed in claim 17, wherein the differential pair circuit further comprises:

a first BJT having a first base as one of the differential inputs, a third terminal coupled to the first current mirror, and a fourth terminal coupled to the current source; and a second BJT having a second base as the other of the differential inputs, a fifth terminal coupled to the first current mirror, and a sixth terminal coupled to the current source.

19. The DC/DC converter as claimed in claim 18, wherein the first current mirror further comprises:

a first MOS transistor having a seventh terminal coupled to a second power voltage, and an eighth terminal and a first control terminal both coupled to the third terminal of the first BJT; and a second MOS transistor having a second control terminal coupled to the first control terminal, a ninth terminal coupled to the second power voltage, and a tenth terminal coupled to the fifth terminal of the second BJT.

20. The DC/DC converter as claimed in claim 16, wherein the first level shifter further comprises:

a third MOS transistor having a third control terminal coupled to the first terminal of the power transistor, an eleventh terminal coupled to one of the differential inputs, and a twelfth terminal coupled to the first power voltage.

21. The DC/DC converter as claimed in claim 20, wherein the second level shifter further comprises:

a fourth MOS transistor having a thirteenth terminal coupled to the other of the differential inputs, and a fourth control terminal and a fourteenth terminal both coupled to the third terminal of the dummy transistor.

22. The DC/DC converter as claimed in claim 12, further comprising:

a second current mirror mirroring the operating current to the first level shifter for pulling up the voltage of the first terminal of the power transistor to the operating voltage.

* * * * *